United States Patent [19]

Brown

[11] Patent Number: 4,772,034
[45] Date of Patent: Sep. 20, 1988

[54] SOFT JAW CONSTRUCTION

[75] Inventor: Lawrence H. Brown, Ambler, Pa.

[73] Assignee: Accu-Ring Jaw Systems, Inc., Ambler, Pa.

[21] Appl. No.: 77,632

[22] Filed: Jul. 24, 1987

Related U.S. Application Data

[63] Continuation-in-part of Ser. No. 907,329, Sep. 15, 1986, Pat. No. 4,696,482.

[51] Int. Cl.4 .............................................. B23B 31/10
[52] U.S. Cl. .................................. 279/1 SJ; 279/1 R; 279/123
[58] Field of Search ...................... 279/1 SJ, 123, 1 R, 279/1 L, 1 ME

[56] References Cited

U.S. PATENT DOCUMENTS

| | | | |
|---|---|---|---|
| 2,925,282 | 2/1960 | Borsetti | 279/1 SJ |
| 2,950,117 | 8/1960 | Walmsley | 279/1 SJ |
| 3,160,042 | 12/1964 | Grand | 279/1 SJ X |
| 3,211,464 | 10/1965 | Mott et al. | 279/123 |
| 3,594,960 | 7/1971 | Fourquier | 279/1 R X |
| 3,945,654 | 3/1976 | McMullen | 279/1 SJ X |
| 4,041,612 | 8/1977 | Skubic | 279/1 SJ X |
| 4,223,898 | 9/1980 | Righi | 279/1 R |

Primary Examiner—Gil Weidenfeld
Assistant Examiner—Steven C. Bishop
Attorney, Agent, or Firm—Joseph W. Molasky & Assocs.

[57] ABSTRACT

The soft jaws of a lathe chuck or the like are constructed to be engaged by studs of an adjustable lock ring device for holding the jaws during the machining thereof to fit a workpiece to be held by the jaws.

20 Claims, 2 Drawing Sheets

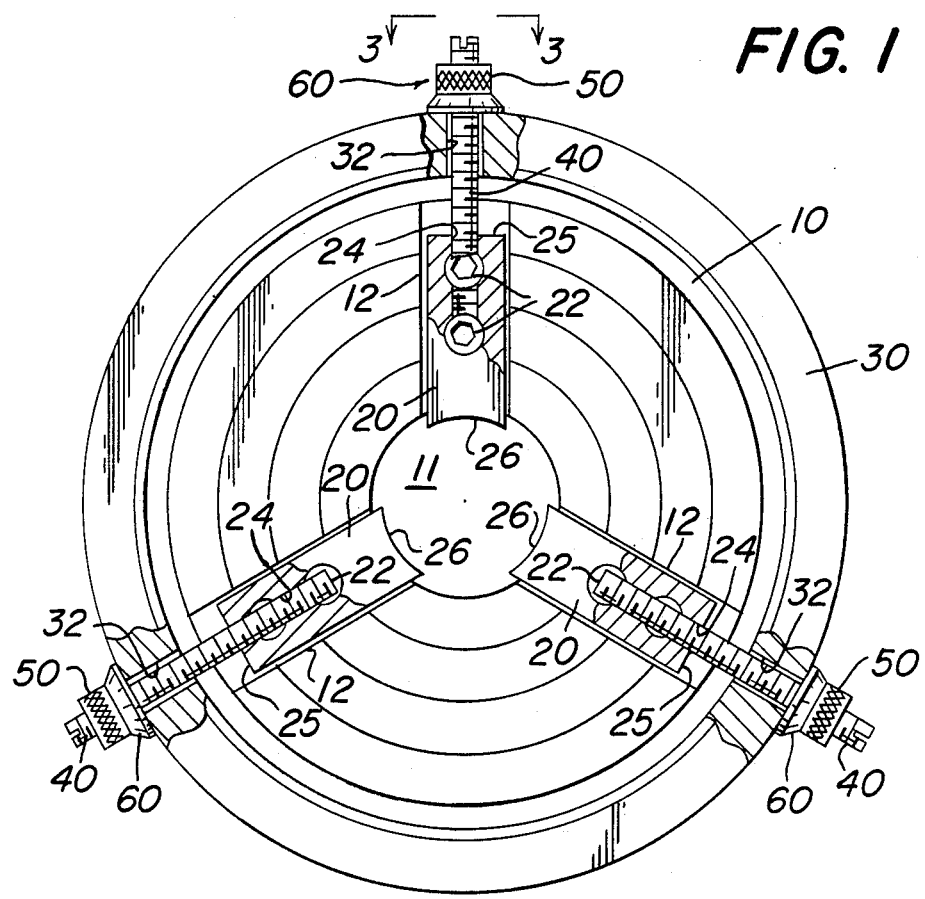
FIG. 1
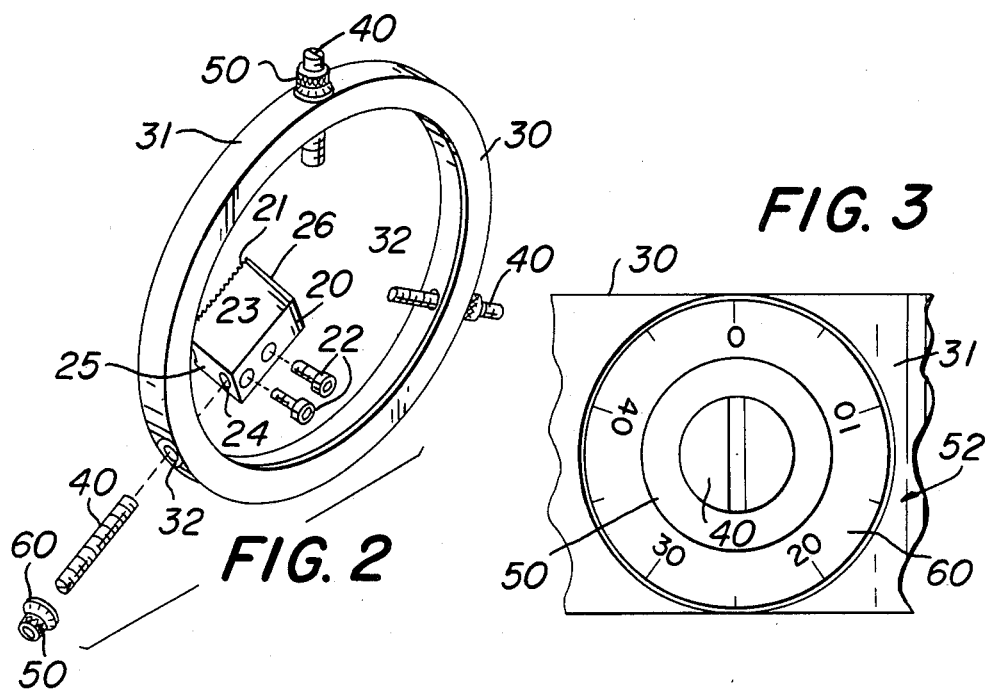
FIG. 2
FIG. 3

SOFT JAW CONSTRUCTION

This application is a continuation-in-part of application Ser. No. 907,329, filed Sept. 15, 1986, now U.S. Pat. No. 4,696,482.

BACKGROUND AND SUMMARY OF THE INVENTION

The invention disclosed in said parent application relates to means for locking the soft jaws of a chuck, such as a lathe chuck or the like, during the procedure for machining the jaws to fit the workpiece to be held by the jaws of the chuck.

In three-jaw lathe chucks, each soft jaw is secured on top of a hard jaw of the chuck and all the soft jaws can be machined by the rotation of the chuck mounted on the spindle of the lathe. Within the past ten years, the computer numerical controlled turning centers have come into widespread use worldwide. Such devices are extremely accurate and produce parts faster and with much better finish than was heretofore possible. The introduction of these devices caused chuck manufacturers to make chucks which require much greater holding pressure per jaw. For example, most of the power chucks available today are hydraulic and involve a holding pressure per jaw which could exceed 10,000 p.s.i. This high pressure is required to hold the parts in the jaws securely so as to withstand the high RPM of the computer numerical controlled machining centers in use today.

However, there are no devices available in the prior art that can lock the soft jaws for the purpose of machining the jaws to fit the workpiece at full chuck pressure and that provides for adjustment of the jaws in locking position for the exact amount of metal removal desired.

A satisfactory locking device of the indicated type must be able to make accurate adjustment for the purpose of machining the exact amount of metal from the jaws so that the jaws fit the workpiece to be held thereby within a tolerance of plus or minus 0.0005 inches, and must be able to stop the jaws within the movement of the chuck attaining the maximum jaw pressure that can be delivered by the chuck. Further, such a device should enable the operator to eliminate the need to machine steel plugs or spiders to afford a saving of average setup time from about 1.5 hours to 15 minutes. Further, such a device must provide some means for the operator to know how much metal he is going to remove during a jaw machining operation. Furthermore, the device must be able to stop the jaws in measured thousandths of an inch. Also, the device must be safe at all times and must be retained securely on the chuck during the machining operation. Furthermore, the device must allow the operator to machine the front of the jaws as well as the internal diameter and be able to bore completely through all of the jaws, typically three.

The jaw locking device disclosed in said parent application achieves all the requirements set forth immediately above. Briefly stated, said jaw locking device comprises a ring adapted to be arranged to encircle the soft jaws, the ring having radially extending holes adapted to be aligned with the axis of radial movement of said soft jaws. The device also includes a plurality of studs, with one stud being secured to and extending outwardly from each of the soft jaws along the axis of radial movement thereof. Each stud extends through an associated radial hole in the ring to extend radially outwardly from the outer surface of the ring and is provided with an externally threaded portion extending outwardly of the ring. The device also includes a plurality of micrometer graduated nuts, one such nut being threadedly engaged on the threaded portion of said studs. The nuts are adjustable axially along the studs to a position to limit the radial inward movement of the soft jaws to thereby locate said soft jaws at a desired position for the machining of the workpiece engaging surfaces on said soft jaws.

In accordance with the present invention, there is provided a novel soft jaw constructed and arranged for use with jaw locking means of the indicated type. Briefly stated, the soft jaws of the present invention are provided with a bore in the outer end thereof adapted to be engaged with an inwardly extending part of a jaw locking means of the indicated type.

PRIOR ART

There is a jaw positioning device in use today, this device being referred to as a top jaw forming device. The prior art device comprises a ring provided with axially extending prongs that are inserted into counterbores formed in the top jaws of the chuck which jaws are not provided with any bore in their outer end. The ring is not secured to the top jaw so that it could slip out of the counterbore thereby presenting a possibility of injury to the operator. Moreover, the jaw is not adjustable and is relatively high in cost.

By the way of marked contrast, the jaw locking means of said parent application is securely engaged to the chuck jaws and could not slip off of the chuck thereby providing a much safer arrangement. Moreover, the jaws can be locked to full hydraulic pressure and the jaw locking ring can be adjusted in very small amounts for removing the exact amount of metal from the jaws whereby the jaws fit very accurately on the part to be held by the jaws.

BRIEF DESCRIPTION OF THE DRAWINGS

FIG. 1 is a front elevational view showing the jaw locking means of said parent application in engagement with the soft jaws of a three-jaw lathe chuck, said jaws being constructed in accordance with the novel soft jaw construction of the present invention.

FIG. 2 is a perspective view showing a jaw locking means and a soft jaw in accordance with the invention.

FIG. 3 is a fragmentary sectional view taken along line 3—3 of FIG. 1.

DETAILED DESCRIPTION OF THE PREFERRED EMBODIMENT

Figure 4:
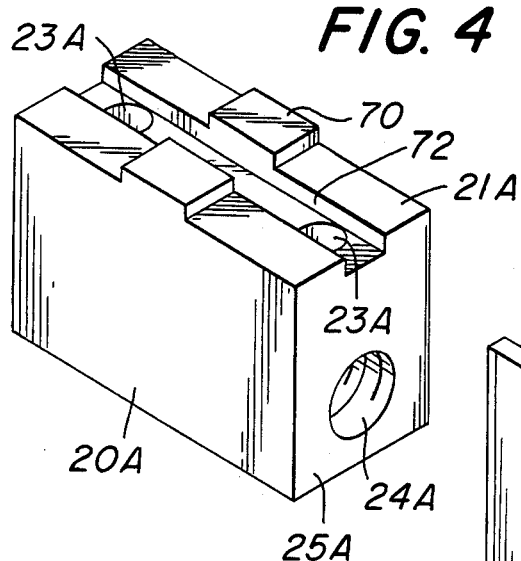
FIGS. 4, 5, 6 and 7 are perspective views of other forms of soft jaws in accordance with the invention.

Referring to FIG. 1, there is shown a three-jaw lathe chuck having a chuck body 10 formed of a one-piece steel casting and provided with means, such as a tapered recess in its rear face, for mounting the chuck on the spindle (not shown) of the lathe. The chuck body 10 and the operating components thereof for effecting simultaneous gripping action by the three chuck jaws (i.e., the jaw setting means) are of an entirely conventional construction and for this reason will be described briefly herein. The construction and operation of the jaw setting means is well understood by those skilled in the art. One example of a jaw setting means for a precision chuck jaw is shown in U.S. Pat. No. 2,777,704. While various chuck jaw setting means may be provided, the means described in said patent comprises a jaw actuating plunger supported for reciprocation axially of the chuck and located within the central bore 11 formed in the chuck body 10. The plunger effects simultaneous gripping action of the jaws upon a workpiece through suitable means such as bell cranks or operating levers which are mounted on pivot shafts and connect the plunger to the master or hard jaws 12, respectively. The hard jaws 12 are retained in radial guideways by conventional rabbeted construction as is well known in the art. The plunger is caused to reciprocate by suitable means to effect a simultaneous radial movement of the hard jaws relative to the central axis of the chuck. As discussed above, many chucks in use today are provided with hydraulically operated power means for providing a holding pressure per jaw which could exceed 10,000 p.s.i.

The three soft jaws 20 (also known in the art as top jaws) shown in FIGS. 1 and 2 are constructed to be securely bolted on top of the hard jaws 12 by means of a pair of bolts 22, each soft jaw 20 mating with its associated hard jaw 12 at a bottom portion 21. The bolts 22 are received in counterbored holes 23 in soft jaws 20 and extend therefrom to threadedly engage the hard jaws 12 associated with each soft jaw 20. As stated above, except for the novel soft jaw construction of the invention, the foregoing structure is generally conventional and is provided on all existing lathe chucks. By means of the jaw locking means described in detail in said parent application, the soft jaws 20 are locked for the purpose of machining the same to fit the workpiece to be held thereby at full chuck pressure.

The jaw locking means comprises a ring 30 made of a material of sufficient size and strength to hold the jaw tension of a power hydraulic chuck, or any other chuck with which it is to be used. By way of example, ring 30 may be made of 1020 steel. Ring 30 is adapted to be arranged to encircle the soft jaws 20 of the chuck and is provided with three radially extending holes 32 equally spaced (120° apart) circumferentially around ring 30. The holes 32 are aligned with the axis of radial movement of the soft jaws for a purpose to be described hereafter.

The jaw locking means also comprises three studs 40, one stud 40 being associated with each soft jaw 20 and being secured thereto to extend radially outwardly therefrom along the radial axis of movement thereof. To this end, the studs 40 are externally threaded throughout their entire length and are engaged in threaded bores 24 in the outer end 25 of the soft jaws 20 to a set position. If desired, studs 40 may be arranged to be bottomed out in said bores 24. The holes 32 are drilled through the ring 30 to provide clearance for the threaded studs 40 to pass readily therethrough. Studs 40 are all the same length and are secured in bores 24 to extend from the outer ends of soft jaws 20 the same distance.

The jaw locking means also comprises three nuts 50, each nut 50 having a knurled surface and being adapted to be threadedly engaged on one of said studs 40 at the outwardly projecting threaded portion thereof as shown in FIG. 1. The nuts 50 are adjustable along the length of the studs 40 to position, or limit the radial movement of, the soft jaws 20 so as to locate said soft jaws 20 at a desired position for the machining of the workpiece engaging surfaces 26 of said soft jaws 20 as will be described hereafter.

There are also provided three annular discs 60 having a circular scale formed on the outer surface thereof, each nut 50 being provided with a disc 60 as a unitary part formed on the inner end thereof as is shown in the Drawings. The circular scale on each disc 60 is provided by twenty circumferentially equally spaced marks with the numbers 0, 10, 20, 30 and 40 adjacent appropriate marks as shown in FIG. 3. Also, the outer surface 31 of ring 30 is provided with a reference mark 52, in the form of an arrowhead, adjacent the scale on each disc 60 to allow the operator to determine the amount of rotation of a nut 50 from an initial position thereof for a purpose to be described more fully hereafter.

In accordance with a preferred embodiment, the studs 40 are ¼ inch in diameter and are threaded to provide twenty threads per inch. This provides for adjustment of the nuts 50 to be 0.050 inches for one complete turn of a nut 50 and 0.0025 inches for rotation through one of the twenty increments provided by the marks on the scale on a disc 60. The holes 32 in the ring 30 are drilled 1/32 of an inch oversize to provide the clearance necessary for insertion of the studs 40 therethrough. The threaded bores 24 in the ends of the soft jaws 20 are also threaded to provide twenty threads per inch in order to threadedly engage the inner ends of the studs 40.

The novel feature of the soft jaws 20 shown in FIGS. 1 and 2 is the provision of the threaded bore 24 in the outer end 25 thereof. Bore 24 is arranged to extend longitudinally of the jaw body which is elongated in the direction of jaw adjustment. Thus bore 24 extends radially along the radial axis of movement of the soft jaws 20. For the purposes of this disclosure, the bore 24 of each soft jaw 20 extends longitudinally to the jaw body whereas the bores 23 extend transversely thereto. Moreover, the bores 24 are adapted to be threadedly engaged with the inner ends of the studs 40 of the jaw locking means of the type disclosed in said parent application. It will be apparent that the bore 24 must be located to avoid interference with the bolts 22 which are contained in counterbores 23 to secure a soft jaw 20 to its associated hard jaw 12 so as to mate at a bottom portion 21.

In FIG. 4, there is shown a soft jaw 20A of the type known in the art as a "tongue and groove soft jaw". The bottom portion 21A of jaw 20A that mates with an associated hard jaw is provided with a transverse tongue 70 located centrally on the jaw 20A as is apparent from a consideration of FIG. 4. Bottom portion 21A is provided with a centrally located longitudinal groove 72 and bores 23A for receiving the bolts that secure the soft jaw 20A to an associated hard jaw. The novel feature of soft jaw 20A is the longitudinally extending threaded bore 24A in outer end 25A. Bore 24A is adapted to be threadedly engaged with the inner end of the studs of a jaw locking means such as that described in FIGS. 1-3.

Figure 5:
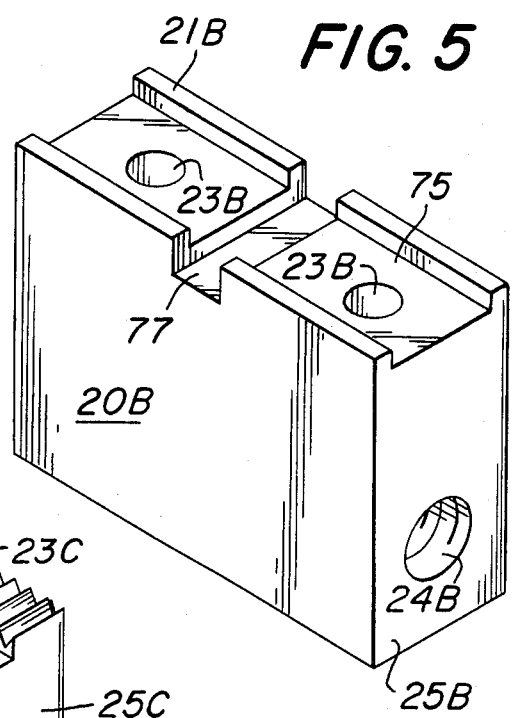

In FIG. 5, there is shown another form of soft jaw in accordance with the invention. The soft jaw 20B is known in the art as a "manual soft jaw". Soft jaw 22B has a bottom portion 21B that mates with an associated hard jaw and is provided with a longitudinally extending wide groove 75 and a transversely extending narrow groove 77. There is also provided a pair of counterbores 23B for receiving the bolts that secure the soft jaw 20B to an associated hard jaw. The novel feature of soft jaw 20B is the longitudinally extending threaded bore 24B in the outer end 25B. Bore 24B is adapted to be threadedly engaged with the inner end of the studs of a jaw locking means such as that described in FIGS. 1-3.

Figure 6:
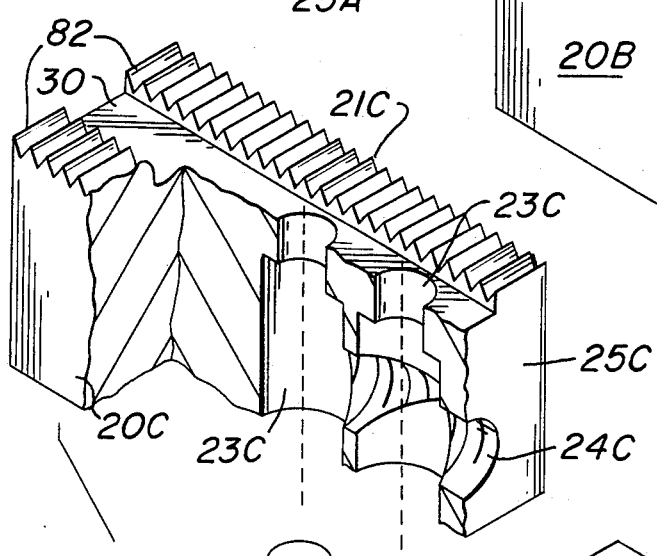

FIG. 6 discloses another form of soft jaw in accordance with the invention. The soft jaw 20C is of a type particularly adapted for use with power chucks. Soft jaw 20C has a bottom portion 21C that mates with an associated hard jaw and is provided with a longitudinally extending central groove 80 and a pair of serrated surfaces 82 on each side of groove 80. Bottom portion 21C is provided with a pair of counterbores 23C for receiving the bolts 22C that secure the soft jaw 20C to an associated hard jaw. The novel feature of soft jaw 20C is the longitudinally extending bore 24C in the outer end 25C. Bore 24C is adapted to be threadedly engaged with the inner end of the studs of a jaw locking means such as that described in FIGS. 1-3.

Figure 7:
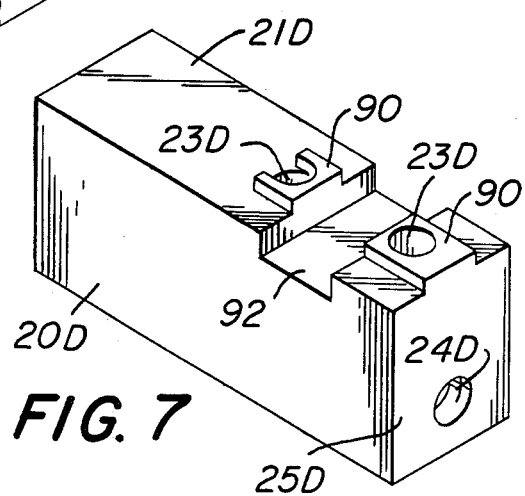

In FIG. 7, there is shown another soft jaw 20D in accordance with the invention adapted for use with power chucks. Soft jaw 20D has a bottom portion 21D that mates with an associated hard jaw and is provided with a tongue 90 that extends longitudinally from the outer end 25 along one half of the bottom portion 21D. A transversely extending groove 92 extends through tongue 90 as shown in FIG. 7. The bottom portion 21D is provided with a pair of bores 23D for receiving the bolts that secure the soft jaw 20D to an associated hard jaw. The novel feature of soft jaw 20D is the longitudinally extending threaded bore 24D in outer end 25D. Bore 24D is adapted to be threadedly engaged with the inner end of the studs of a jaw locking means such as that described in FIGS. 1-3.

OPERATION

In using the jaw locking means shown in FIGS. 1-3, the first step is to bolt the three soft jaws 20 to the hard jaws 12 of the chuck by means of the bolts 22. Next the ring 30 is positioned to encircle the soft jaws 20 and the three studs 40 are passed through the holes 32 in the ring 30 and threaded into the threaded bores 24 in the soft jaws 20 to a set position. After this step, the three studs 40 will extend an equal distance from the soft jaws 20 along the axis of movement thereof radially of the chuck center.

The next step is to place the workpiece to be held by the soft jaws 20 within the inner ends thereof and to close the chuck at full pressure.

The next step is to center the ring 30 as concentric as possible relative to the central axis of the chuck. In this step, the nuts 50 (and disc 60) are run down onto the outer ends of the studs 40 to the outer surface 31 of the ring 30. The nuts 50 (and disc 60) are finger tightened onto the outer surface 31 of the ring 30 when the concentric position is achieved.

The next step is for the operator to calculate the amount of metal removal required. After this determination is made, the operator opens the chuck, removes the workpiece and then backs off the nuts 50 on the three studs 40 to the exact number of thousandths to achieve the amount of metal removal desired. The operator can make the desired adjustment of the three nuts 50 by keeping in mind that each increment on the scale on a disc 60 is 0.0025 thousandths of an inch and one complete turn is 0.050 thousandths of an inch. After the nuts 50 have been adjusted, the chuck is closed at full pressure and the nuts 50 will lock the soft jaws 20 exactly where they should be to bore out the surface 26 thereof to fit the workpiece accurately. It will be apparent that nuts 50 "lock" the soft jaws 20 in the desired position by engaging ring 30 at the outer surface 31 thereof to limit the radial inward movement of each stud 40 and the soft jaw 20 secured thereto.

The final step in the operation is to bore out the jaws to fit the workpiece. This step, is of course, well known.

It is noted that, depending on the conditions, the operator may want to achieve the jaw formation in several removal steps. This will permit the operator to have the final boring out step remove only a small amount of metal, as for example, only 0.010 of an inch.

At the end of the procedure described above, the workpiece and the surfaces 26 of the soft jaws 20 are a perfect match. Thus, when the workpiece is placed within the chuck, the soft jaws 20 are closed around the workpiece in a very secure and accurate holding position, and in a manner so as to position the soft jaws 20 very accurately even at very high jaw engaging pressures, such as 10,000 p.s.i. By virtue of the jaw locking means of this invention, it is possible to achieve an extremely good surface contact all the way around the jaw surfaces 26 of each soft jaw 20 in contact with the workpiece.

All presently available chucks give rise to a certain degree of deflection when placed under pressure but the present invention compensates for this by allowing the operator to bore jaws to fit the workpiece in normal fashion. When used in combination with the jaw locking ring of application Ser. No. 907,329 an operator may hold the jaws at full hydraulic pressure and any measurable amount of deflection is bored out during the boring operation.

This invention has been described by reference to precise embodiments but it will be appreciated by those skilled in the art that this invention is subject to various modifications and to the extent that those modifications would be obvious to one of ordinary skill they are considered as being within the scope of the appended claims.

What is claimed is:

1. For use with a chuck, such as a lathe chuck or the like, having a plurality of hard jaws guided for sliding movement toward and away from a chuck center and radially to the chuck axis by the jaw setting means of the lathe or the like, a soft jaw secured on top of each of said hard jaws for conjoint movement therewith as a unit radially to the chuck axis, and means for locking each soft jaw at a desired position for the machining of the workpiece engaging surface of each said soft jaw, a novel soft jaw comprising a body having an inner end providing said workpiece engaging surface, an outer end located at the opposite end of said body, and a bore in said outer end adapted to be engaged with an inwardly extending part of the jaw locking means, said bore extending inwardly in the longitudinal direction between said outer and inner end.

2. A soft jaw according to claim 1 wherein said bore is threaded.

3. A soft jaw according to claim 2 wherein said soft jaw has a top surface, a bottom surface adapted to mate with the hard jaw to which said soft jaw is secured, and a pair of counterbores extending through said soft jaw from said top surface to said bottom surface.

4. A soft jaw according to claim 3 wherein said bottom surface has a centrally located longitudinally extending groove and a transversely extending tongue portion.

5. A soft jaw according to claim 3 wherein said bottom surface has a longitudinally extending relatively wide groove and a transversely extending relatively narrow groove.

6. A soft jaw according to claim 3 wherein said bottom portion has a longitudinally extending central groove and a pair of serrated surfaces on each side of said central groove.

7. A soft jaw according to claim 3 wherein said bottom surface has a tongue that extends longitudinally from said outer end along approximately one half of said bottom portion and a transversely extending groove that extends through said tongue.

8. A soft jaw according to claim 3 including means adapted to be received in said counter-bores for securing said soft jaw to the hard jaw.

9. A soft jaw according to claim 8 wherein said means for securing said soft jaw to the hard jaw comprises a pair of bolts each of which is adapted to be received in one of said counterbores.

10. A soft jaw adapted to be secured to a hard jaw for use with a chuck such as a lathe chuck or the like comprising:
a body having an inner end providing a workpiece engaging surface, an outer end located at the opposite end of said body, and a bore in said outer end extending along a longitudinal axis extending between said outer and inner ends.

11. A soft jaw according to claim 10 wherein said bore is threaded.

12. A soft jaw according to claim 11 wherein said soft jaw has a top surface, a bottom surface adapted to mate with the hard jaw to which said soft jaw is secured, and a pair of counterbores extending through said soft jaw from said top surface to said bottom surface.

13. A soft jaw according to claim 12 wherein said bottom surface has a centrally located longitudinally extending groove and a transversely extending tongue portion.

14. A soft jaw according to claim 12 wherein said bottom surface has a longitudinally extending relatively wide groove and a transversely extending relatively narrow groove.

15. A soft jaw according to claim 12 wherein said bottom portion has a longitudinally extending central groove and a pair of serrated surfaces on each side of said central groove.

16. A soft jaw according to claim 12 wherein said bottom surface has a tongue that extends longitudinally from said outer end along one approximately one half of said bottom portion and a transversely extending groove that extends through said tongue.

17. A soft jaw according to claim 12 including means adapted to be received in said counterbores for securing said soft jaw to the hard jaw.

18. A soft jaw according to claim 17 wherein said means for securing said soft jaw to the hard jaw comprises a pair of bolts, each of said bolts being adapted to be received in one of said counterbores.

19. A soft jaw according to claim 2 wherein said body of said soft jaw is a one-piece construction, and including means for securing said one-piece body directly to the hard jaw for the conjoint movement thereof.

20. A soft jaw according to claim 11 wherein said body of said soft jaw is a one-piece construction, and including means for securing said one-piece body directly to the hard jaw at only one fixed position for the conjoint movement thereof

* * * * *